United States Patent [19]

Ridgewell

[11] Patent Number: 4,964,199
[45] Date of Patent: Oct. 23, 1990

[54] SECURING ARRANGEMENT

[75] Inventor: Peter Ridgewell, Salisbury, England

[73] Assignee: Plessey Overseas Limited, Ilford, England

[21] Appl. No.: 399,114

[22] Filed: Aug. 28, 1989

[30] Foreign Application Priority Data

Aug. 27, 1988 [GB] United Kingdom ............... 8820418

[51] Int. Cl.⁵ .................... A44B 11/25; B63B 25/00
[52] U.S. Cl. .................................... 24/603; 410/85
[58] Field of Search .................. 24/603, 602, 574; 248/222.1; 410/85

[56] References Cited

U.S. PATENT DOCUMENTS 2,824,315  2/1958  McKenny ........................ 24/603
3,667,566  6/1972  Hopkins ......................... 24/603
4,136,415  1/1979  Blockburger .................... 24/603
4,372,738  2/1983  Black et al. .................... 24/603
4,570,987  2/1986  Wong et al. ..................... 410/85

Primary Examiner—Victor N. Sakran
Attorney, Agent, or Firm—Fleit, Jacobson, Cohn, Price, Holman & Stern

[57] ABSTRACT

A security arrangement for grooved shafts or bolts uses a plurality of toothed collet members held in securing abutment by a cap member. The cap member is held in position by a displaceable chock member. The chock member is readily displaceable such that the securing arrangement can be rapidly released. Conveniently, the chock member may be displaced by a spring member, the spring member being held in a bias position by a cord attached to the chock member.

7 Claims, 2 Drawing Sheets

SECURING ARRANGEMENT

The present invention relates to a securing arrangement and more particularly, but not exclusively, to a securing arrangement for securing a bolt in a housing orifice.

A prior securing arrangement for a shaft or bolt particularly a high retention force bolt, uses collet members. The collet members engage a groove formed in the bolt under the action of a compressive collar. The collar and collet members normally engage the periphery of a housing orifice. The prior securing arrangement achieves a high retention force. However, it is very difficult to provide rapid release, due to the necessity of rigidity to achieve such strength. Previously, rapid release, high retention force securing arrangements have been provided by exploding bolts and high energy (force) guillotine squibs.

There is a requirement to provide a rapid release, high retention force securing arrangement for deploying an article such as a sonobuoy.

It is an objective of the present invention to provide a securing arrangement that allows such rapid release with a low energy device.

According to the present invention there is provided a securing arrangement for securing a circumferentially grooved shaft in a housing wall, the arrangement comprising a cap member, collet means and a displaceable chock member, the collet means being arranged when within the cap member to engage the grooved shaft, the cap member having a shaped cavity whereby when the collet means engages the grooved shaft then an axial force is placed upon the cap member forcing it axially from the grooved shaft and so dis-engaging the collet means from the grooved shaft, the displacement chock member being arranged to act against the axial force to prevent dis-engagement of the collet means from the grooved shaft, the displaceable chock member being readily displaceable such that the collet means may be rapidly dis-engaged from the grooved shaft so releasing the shaft from the housing.

An embodiment of the present invention will now be described by way of example only with reference to the accompanying drawings in which.

Figure 1:
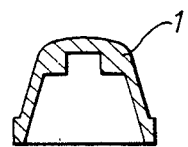
FIG. 1 illustrates, in cross-section, a cap in accordance with the present invention.
Figure 2:
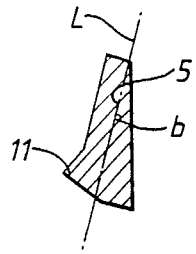
FIG. 2 illustrates, in cross-section, a collet member in accordance with the present invention.
Figure 3:
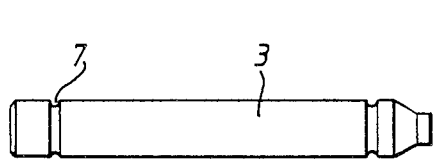
FIG. 3 illustrates, in side view, a grooved bolt suitable for use with the securing arrangements of the present invention.
Figure 4:
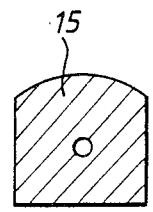
FIG. 4 illustrates, in cross-section, a chock member in accordance with the present invention.
Figure 5:
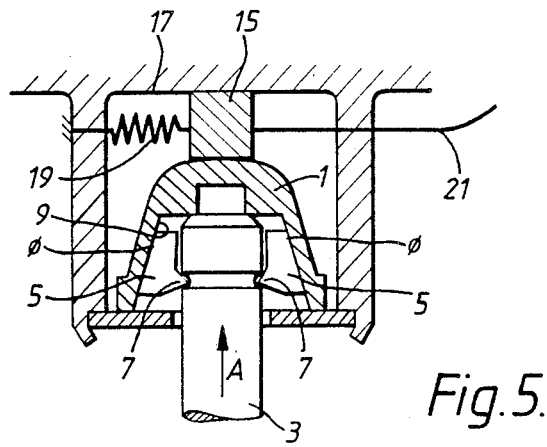
FIG. 5 illustrates, in cross-section, a securing arrangement in accordance with the present invention; and, FIG. 6 illustrates the securing arrangement, as illustrated in FIG. 5, arranged to secure a sonobuoy.

Consider FIGS. 1 to 5. A cap member 1 is arranged to enclose an end of a circumferentially grooved shaft or bolt 3 with a plurality of collet members 5 abutting a groove 7 in the bolt 3. The cap member 1 has a cavity 9 with walls at a cap angle $\phi$ to the bolt 3 lateral axis. Each collet member 5 has a tooth projection 11 and a back wall at a collet angle b to its longitudinal axis L. The tooth projection 11 is arranged to engage the groove 7. The cap angle $\phi$, collet angle b and tooth projection 11 are determined such that an axial force component is present axially displacing the cap member 1 so releasing the collet members 5. It has been found that a convenient value for collet angle b is 15° and this ensures that there is sufficient lateral abutment force from the collet members 5 against the shaft 3 whilst there is a vertical force component A. The vertical force component A is sufficient to provide axial displacement of the cap member 1.

In order to facilitate ready release of collet members 5 as the cap is axially displaced, it is preferable to angle the collet member 5 lower face wall by a lower face angle. A practical value for the lower face angle is 20° to the collet's horizontal axis H.

In operation, axial displacement of the cap member 1 is prevented by a chock member 15 in abutment with a housing wall 17. In the present invention this chock member 15 is readily displaced such that the cap member 1 can be axially displaced thus quickly releasing the bolt 3.

The chock member 15 can be displaced using a spring member 19. A cord 21 can be used to hold the spring member 19 in a bias position with the chock member 15 preventing axially displacement of the cap member 1. To release the bolt 1, the cord 21 is severed or released preferably with an initiator such as a rapid burn device produced by ICI/NOBEL R.T.M. Once the cord 21 is severed then the spring 19 is released from its bias position, displacing the chock member 15 allowing the cap member 1 to move axially thus releasing the collet members from the grooves 7 in bolt 3. The bolt 3 is then released.

It will be appreciated that other methods of displacing the chock member 15 could be used including push-rods, electromagnetic solenoids, screw-threads, balanced counter-weights and pneumatics for example. Furthermore, the cord 21 when present can be severed or released by a multitude of alternative methods including manual cutting and automatic guillotine devices.

Figure 6:
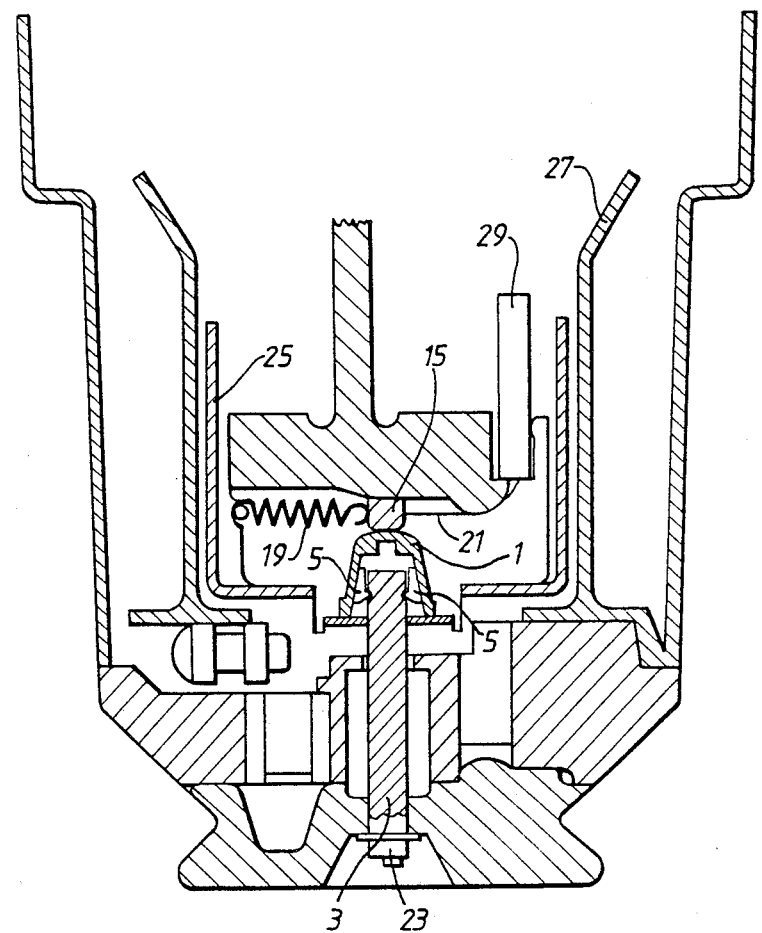

In FIG. 6, the securing arrangement as illustrated in FIGS. 1–5 is shown in cross-section within a sonobuoy arrangement. A collet end of the shaft 3 is secured using a securing arrangement according to the present invention whilst the shaft 3 has another end secured with a bolt 23 and washer. The collet members 5 engage the shaft 3 through its groove and are held by the cap member 1. The cap member 1 is prevented from axial displacement by the chock member 15. Thus, the shaft 3 holds together a first housing 25 and a second housing 27.

To separate the first housing 25 and the second housing 27, a rapid burn device 29 releases the cord 21 and so the chock member 15 is displaced by the spring 19. The cap member 1 is then axially displaced by the vertical force component A and the shaft 3 is released removing any connection between the first housing 25 and the second housing 27.

It will be appreciated that the present securing arrangement allows release of a high retention force shaft using a relatively low energy release mechanism, such as a repaid burn device for example.

I claim:

1. A securing arrangement for securing a circumferential grooved shaft in a housing wall, the arrangement comprising a cap member, collet means and a displaceable chock member, the collet means being arranged when within the cap member to engage the grooved shaft, the cap member having a shaped cavity whereby when the collet means engages the grooved shaft then an axial force is placed upon the cap member forcing it axially from the grooved shaft and so dis-engaging the collet means from the grooved shaft, the displacement chock member being arranged, in operation, to act against the axial force to prevent dis-engagement of the collet means from the grooved shaft, the displaceable chock member being readily displaceable such that the collet means may be rapidly dis-engaged from the grooved shaft so releasing the shaft from the housing.

2. A securing arrangement as claimed in claim 1 wherein the chock member is coupled to bias means and fastener means whereby, in operation, the chock member abuts the cap member with the bias means held in a biased position by the fastener means whilst when the fastener means is released then the chock member is displaced from abutment with the cap member and the shaft released from the housing.

3. A securing arrangement as claimed in claim 2 wherein the bias means is a spring member.

4. A securing arrangement as claimed in claim 2 wherein the fastener means is a cord.

5. A securing arrangement as claimed in claim 4 wherein the cord is connected to a rapid burn device such that when the rapid burn device is activated the cord is released.

6. A securing arrangement as claimed in claim 1 wherein each collet member is arranged to have a back wall arranged to abut the cap's cavity, the back wall being at a collet angle substantially 15° to the collet members longitudinal axis.

7. A securing arrangement as claimed in claim 1 wherein each collet member is arranged to have a lower face wall at a lower face angle of substantially 20° to the horizontal axis.

* * * * *